(12) United States Patent
Yamada

(10) Patent No.: US 6,690,494 B1
(45) Date of Patent: Feb. 10, 2004

(54) TENSION ADJUSTABLE MECHANISM FOR RECIPROCATINGLY MOVING PRINT/READ HEAD DEVICE

(75) Inventor: Noriyuki Yamada, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/357,660

(22) Filed: Jul. 20, 1999

(30) Foreign Application Priority Data

Jul. 22, 1998 (JP) .......................... 10-206258

(51) Int. Cl.[7] .................................. H04N 1/04
(52) U.S. Cl. ........................... 358/497; 271/84
(58) Field of Search ................ 358/474, 497, 358/296, 505, 506, 486, 490, 494; 271/84, 42

(56) References Cited

U.S. PATENT DOCUMENTS

| | | | | |
|---|---|---|---|---|
| 4,487,518 A | * | 12/1984 | Enrini | 400/320 |
| 4,746,237 A | * | 5/1988 | Takeda | 400/335 |
| 6,164,755 A | * | 12/2000 | Yamamoto | 347/37 |
| 6,260,945 B1 | * | 7/2001 | Niikura | 347/37 |

FOREIGN PATENT DOCUMENTS

| | | | | |
|---|---|---|---|---|
| JP | A-58-3891 | 1/1983 | | |
| JP | A-60-120079 | 6/1985 | | |
| JP | U-63-25555 | 2/1988 | | |
| JP | A-63-176649 | 7/1988 | | |
| JP | 03146381 | * 6/1989 | ............ | B41J/19/20 |
| JP | A-2-86483 | 3/1990 | | |
| JP | A-3-146381 | 6/1991 | | |
| JP | A-4-110174 | 4/1992 | | |
| JP | A-4-151279 | 5/1992 | | |
| JP | A-10-129069 | 5/1998 | | |

* cited by examiner

*Primary Examiner*—Kimberly A. Williams
*Assistant Examiner*—Negussie Worku
(74) *Attorney, Agent, or Firm*—Oliff & Berridge, PLC

(57) ABSTRACT

The invention includes a driving pulley mounted to a carriage driving motor fixed to a chassis frame of a facsimile apparatus, a following pulley mounted to a bracket that is movably mounted along a guide groove provided in a chassis frame, and a timing belt rotated around the driving pulley and the following pulley. The top end of a guide shaft protruded from a base block of the bracket, is movably supported by a support portion uniformly protruded from the chassis frame. A compression spring provided to the guide shaft is arranged between the support portion and the bracket, and presses the bracket to apply tension to the timing belt. The bracket is restricted so as not to approach the driving pulley using a stopper fixed to the chassis frame. Therefore, the tension of the timing belt for reciprocatingly moving the carriage mounting the print head, is not loosened.

24 Claims, 11 Drawing Sheets

TENSION ADJUSTABLE MECHANISM FOR RECIPROCATINGLY MOVING PRINT/READ HEAD DEVICE

BACKGROUND OF THE INVENTION

1. Field of Invention

The invention is related to an image forming apparatus for forming an image on a printing medium or an image reading device for reading images of an original in a facsimile device or a copying device. Specifically, the invention is related to the tension adjustable mechanism of a device that reciprocatingly moves the carriage on which a print head and/or a scanner is mounted.

2. Description of Related Art

There are printing units of a facsimile device or a copying device for forming images on a printing medium, having a structure such that the carriage on which the print head is mounted, is connected to a wire or a timing belt wound around a driving pulley mounted to the output shaft of the stepping motor (driving motor), and a following pulley, so that the carriage reciprocatingly moves in a perpendicular direction to the printing medium transferring direction.

When the stepping motor starts and stops or the carriage changes its movement, quite a large tension occurs in the endless wire or timing belt from the inertia of the carriage. Therefore, if the pulley is fixed to the frame (chassis frame) and the rigidity of the supporting portion of the pulley is not large, vibration occurs and the hunting phenomenon occurs when the carriage moves. Therefore, the printing (formed image) quality becomes bad because the formed images are out of position when the carriage moves reciprocatingly.

When a timing belt is used and the belt becomes slack due to age, the tension power set when the belt was new is decreased drastically and the engagement of the gears becomes worse between the timing belt and the following pulley. Thus, the durability is decreased.

To solve the above-described problems, Japanese Unexamined Patent Publication No. 58-3891, Japanese Unexamined Patent Publication No. 63-176649 and Japanese Unexamined Patent Publication No. 3-146381 disclose the following structure. The driving pulley is fixed to the frame and the bracket supporting the following pulley is supported movably parallel to the direction of the tension added to the endless belt. A tension spring, a compression spring, or the like, for adding tension, is mounted to the bracket.

However, in the above-described prior art, when the heavy carriage mounting the print head starts to move suddenly from its stationary state (the starting time of the printing operation), the force of inertia is generated. Therefore, the driving pulley and the following pulley are easily moved against the force of the spring in a direction such that the distance between the axes of the pulleys becomes short, and the tension applied by the spring is extremely decreased momentarily and the timing for movement of the carriage is thrown off. In particular, when a timing belt is used, the printing quality becomes extremely bad because the gear of the following pulley and the engaging surface of the timing belt, do not engage properly.

SUMMARY OF THE INVENTION

One aspect of the invention is to provide a printing apparatus having no decrease of durability and no decrease of printing quality. To achieve this aspect, an image recording/reading apparatus of the invention records/reads an image by reciprocatingly moving a carriage on which a print head and/or a scanner is mounted. The image recording/reading apparatus includes a first pulley arranged fixedly and rotatably in the image recording/reading apparatus, a driving source for driving to rotate the first pulley, a bracket arranged movably relative to the image recording/reading apparatus, a second pulley rotatably supported to the bracket, a belt provided over the first pulley and the second pulley and connected to the carriage, a pressing member arranged between the image recording/reading apparatus and the bracket for applying tension to the belt, and a restricting device for restricting movement of the bracket in a direction that the belt is loosened.

In the image recording/reading apparatus, the belt for reciprocatingly moving the carriage on which the print head and/or scanner is mounted, is provided over the first pulley arranged fixedly in the apparatus and the second pulley rotatably supported by the bracket arranged movably relative to the apparatus. The pressing member is provided between the apparatus and the bracket for applying tension to the belt. The restricting device restricts the movement of the bracket in the direction that the belt is loosened. Therefore, when a large tension is suddenly generated to the belt, for example when the carriage starts to move, the movement of the bracket is restricted so that the belt is not loosened and the movement of the carriage is stable from the start of the operation. When the belt is a timing belt, the improper engagement of the gear of the second pulley and the engaging surface of the timing belt can be prevented, and therefore, the reduction in printing quality can be prevented.

Further objects, details and advantages of the invention will be apparent from the following detailed description, when read in conjunction with the drawings.

BRIEF DESCRIPTION OF THE DRAWINGS

The preferred embodiments of the invention will be described in detail with reference to the following figures wherein.

DETAILED DESCRIPTION OF PREFERRED EMBODIMENTS

The preferred embodiment embodying the invention will be explained referring the figures. A facsimile device 1 will be explained as an example of the image forming apparatus of the invention.

Figure 1:
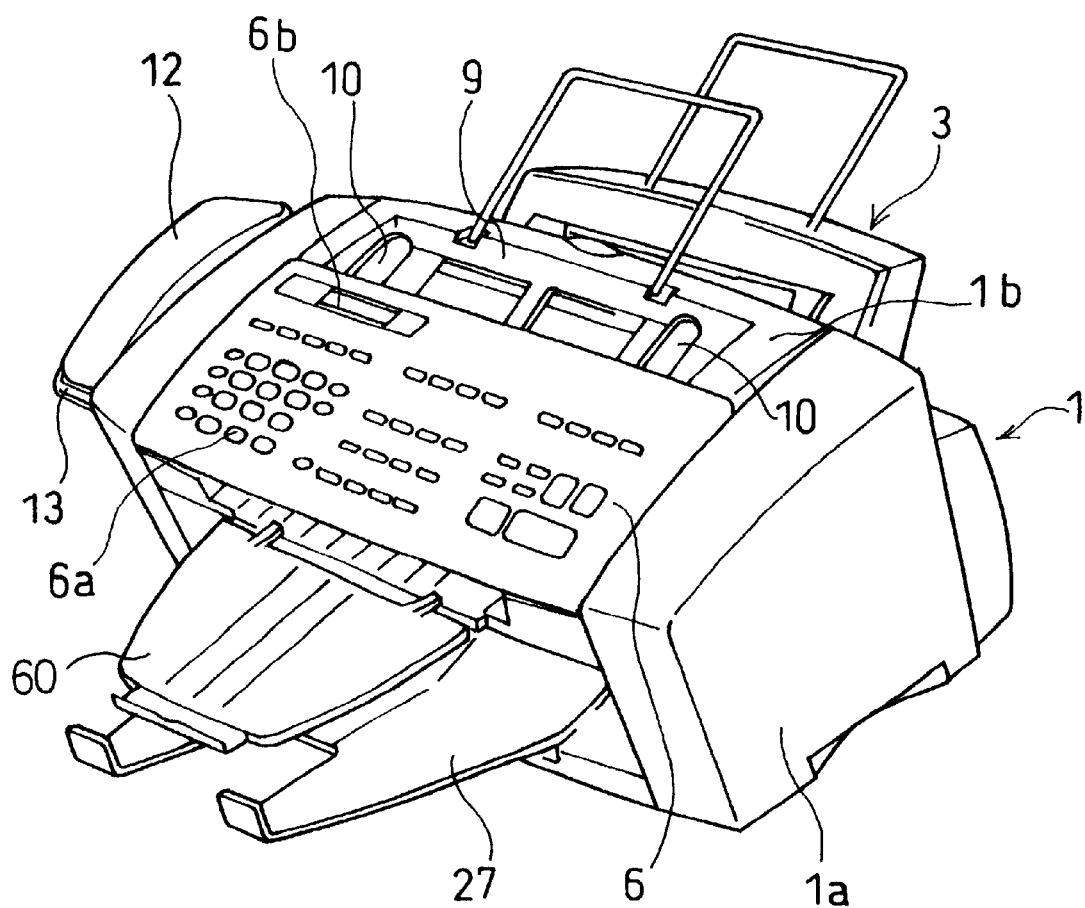
FIG. 1 is a perspective view of the facsimile device.
Figure 2:
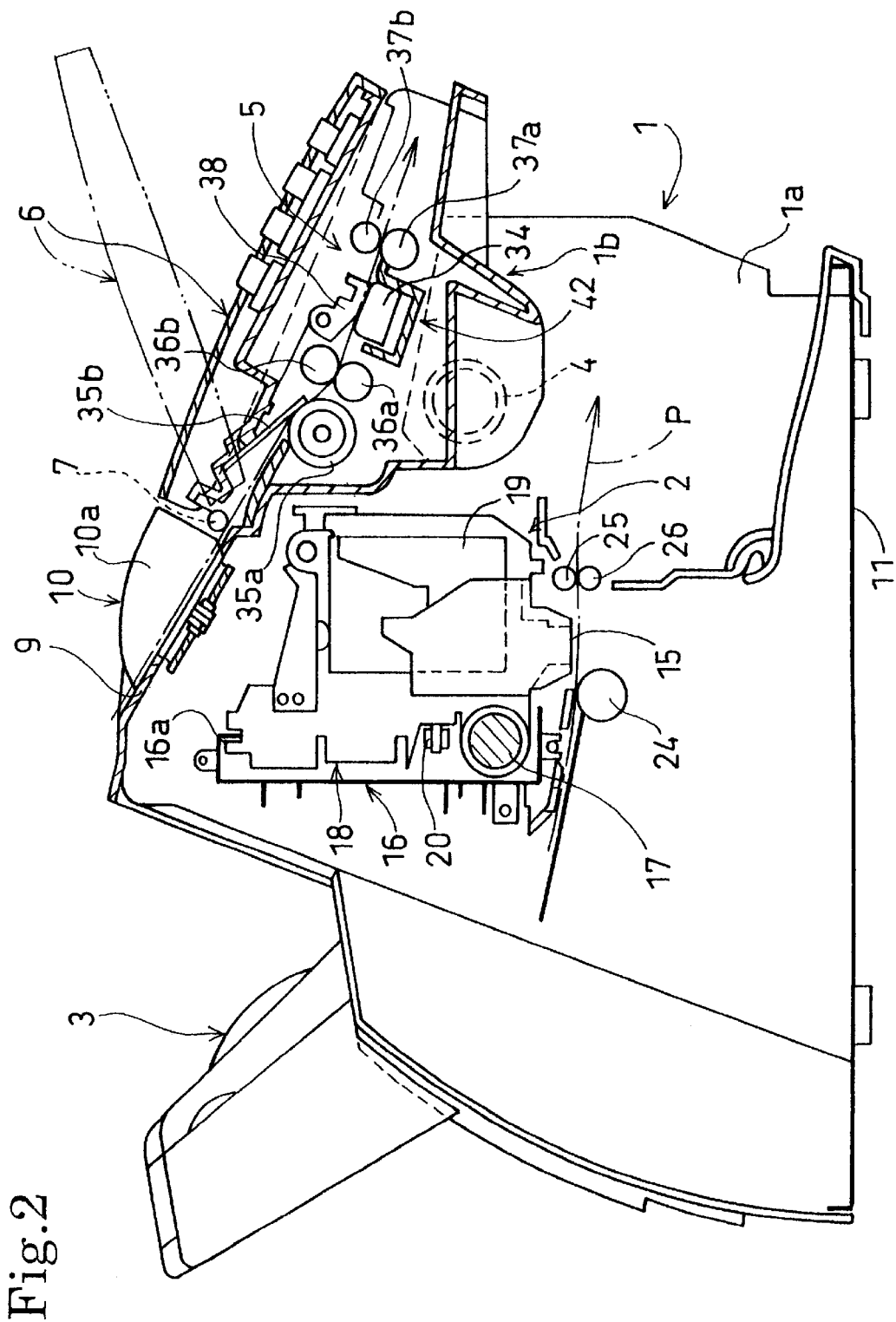
FIG. 2 is a cross sectional view of the facsimile device.

The body case of the facsimile device 1 has a printing unit 2 of the ink jet type therein. The body case includes a main lower case 1a of synthetic resin for receiving from the upper rear side, a paper supplying cassette 3 for supplying a printing paper P for forming images thereon and an upper case 1b of synthetic resin covering the upper side of the main lower case 1a. The upper case 1b is supported by the bracket (not shown) of the side surface of the main lower case 1a so that the upper case 1b rotates around the cylindrical shaft 4 (only one side is shown in FIG. 2) extending from the middle in the front-rear direction of the upper case 1b toward the left and right side, so that the upper case 1b can move widely up and down.

The twisted spring (not shown) of metal is provided so that the coil portion is rotated around the outer surface of the cylindrical shaft 4. One side of the spring is engaged to the metal bracket and the other side of the spring is engaged to a proper portion, such as the metal chassis of the upper case 1b. The upper surface of the upper case 1b is pressed toward the front direction by the twisted spring and normally the upper case 1b is fixed by the hook (not shown) so that the upper surface of the upper case 1b faces up.

An original reading unit 5 is mounted in the upper front portion of the upper case 1b and the upper side of the original reading unit 5 is covered with an operation panel 6. The operation panel 6 has thereon an operation keys 6a, such as various function keys, ten numbered keys, and a display 6b, such as a liquid crystal panel for displaying input values from the operation keys 6a and characters of various commands. The operation panel 6 is supported in its rear portion by a supporting shaft 7 provided on both side surfaces of the upper case 1b so that the front part of the operation keys 6a can be rotated around the supporting shaft 7 and move up and down.

An original positioning part 9 is uniformly formed in the upper rear side of the upper case 1b next to the rear end of the operation panel 6. A pair of original guides 10 are formed on the original positioning part 9 for guiding the both sides of the transferring original. The pair of original guides 10 move synchoronously with each other in the left and right direction.

The lower side of the main lower case 1a is covered with a bottom cover plate 11, such as a metal plate. A control base plate (substrate), a power supply base plate (substrate), NCU (Network Control Unit) base plate (substrate) for communicating with other telephone devices and sending/receiving facsimile data to/from other facsimile devices via telephone lines are provided in the main lower case 1a (not shown). A receiver (hand set) 12 for communicating with other telephone devices is provided on a receiving stand 13 extended outward from the side portion of the main lower case 1a. A speaker (not shown) for calling is fixed on the rear right side of the main lower case 1a.

Figure 3:
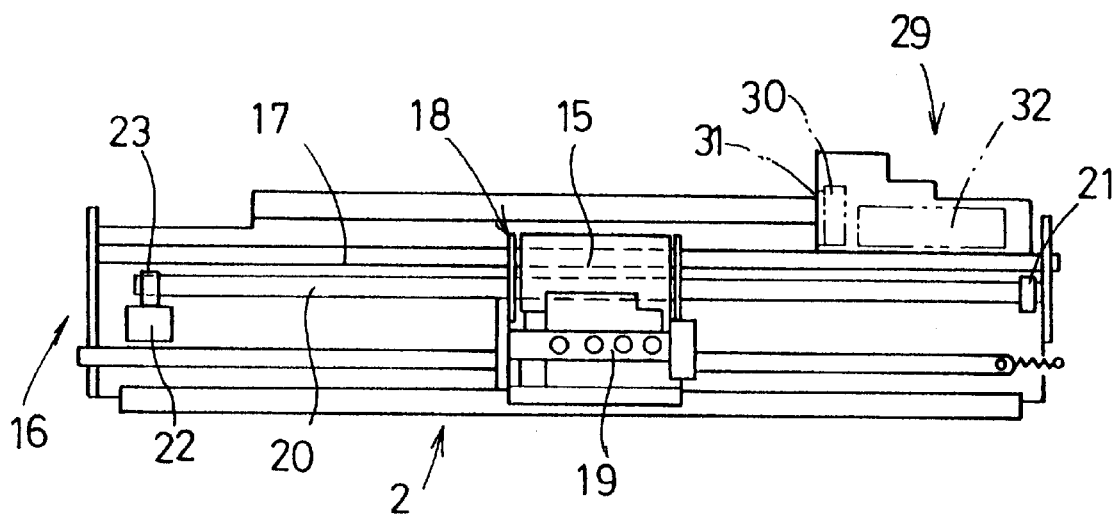
FIG. 3 is a plan view of the recording unit.
Figure 4:
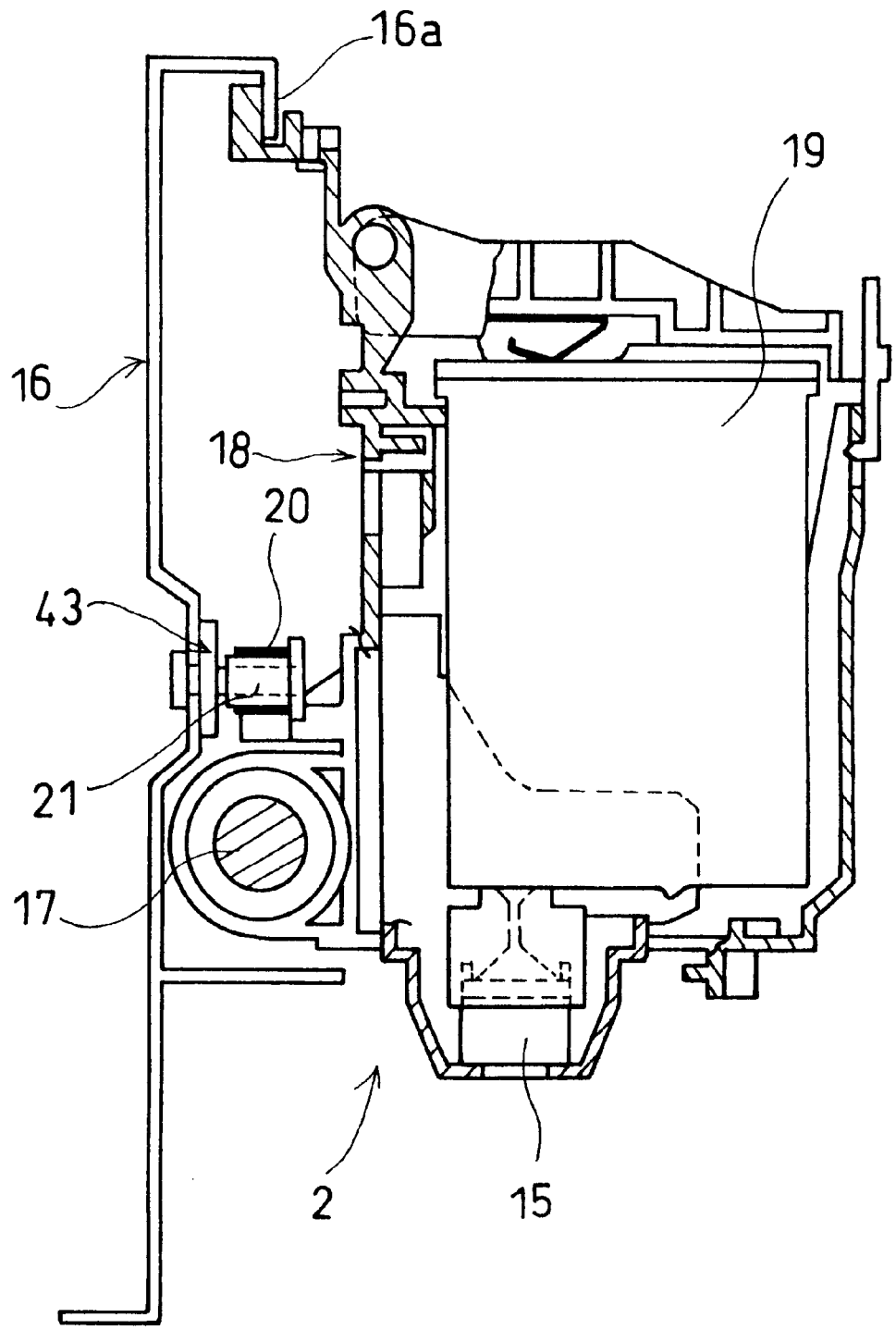
FIG. 4 is a cross sectional view of the carriage.
Figure 5:
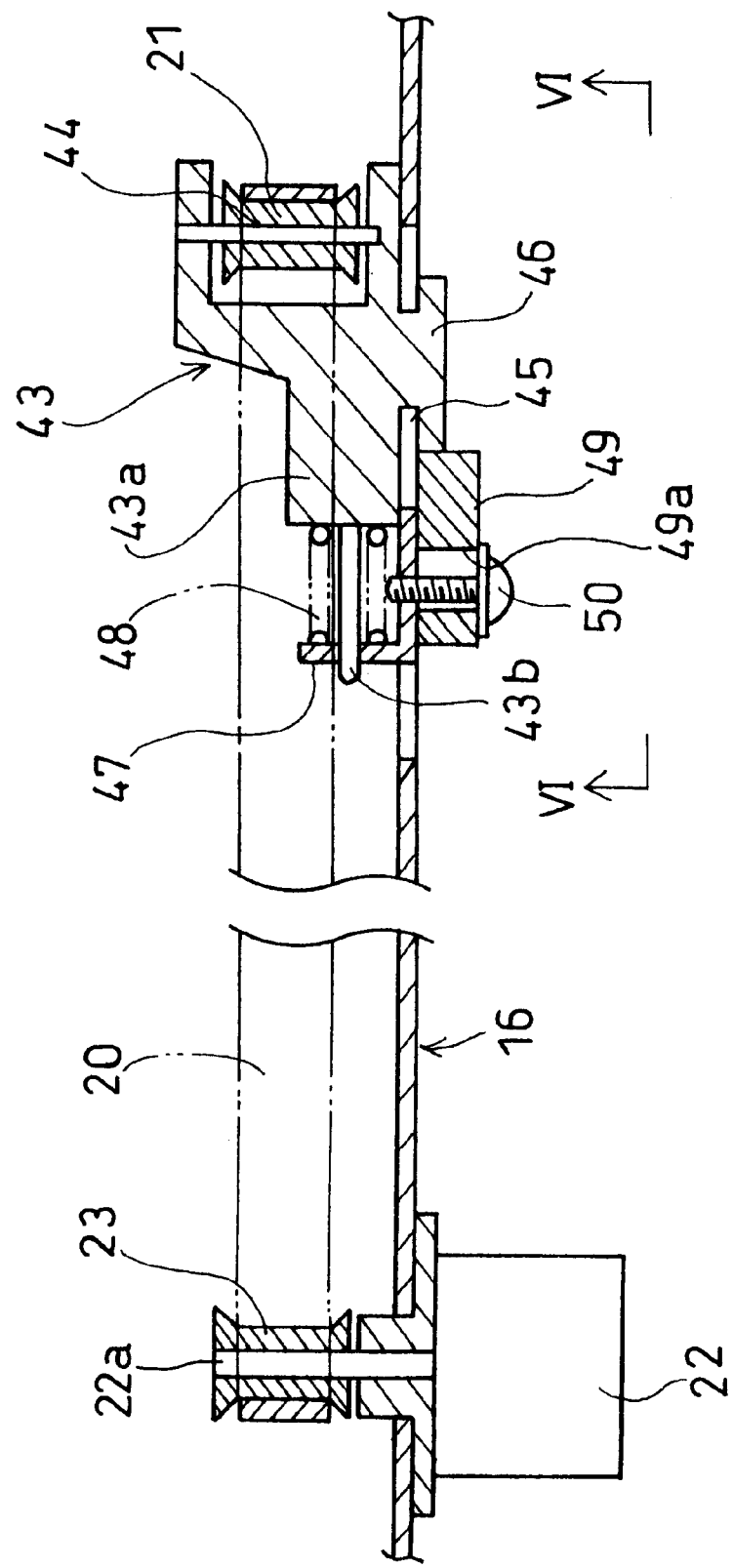
FIG. 5 is a cross sectional view of the main portion of the carriage moving device.

As shown in FIGS. 2, 3 and 4, the carriage 18 is supported by a guide shaft 17 which is a round shaft whose lower part is supported by the chassis frame 16 on the left and right side. The upper part of the carriage 18 is supported by a guide portion 16a of the chassis frame 16 so as to move left and right. A print head 15 of the color ink jet type is mounted on the carriage 18 downwardly. The print head 15 for color printing has four nozzle portions for ejecting ink of cyan, yellow, magenta and black, and cartridges 19 for each color storing ink for supplying to each print head 15 are detachably mounted to the carriage 18. In the preferred embodiment, a print head having six nozzle portions for ejecting ink of cyan, yellow, magenta, black, light cyan and light magenta, can be used.

The timing belt 20 extends parallel to the guide shaft 17 and is wound to a following pulley 21 arranged in one side of the chassis frame 16. A driving pulley 23 is fixed to an output shaft 22a of a carriage driving motor 22, such as a stepping motor rotatable in both forward and reverse directions. Because a portion of the timing belt 20 is connected to the carriage 18, the carriage 18 can move reciprocatingly and parallel to the guide shaft 17.

The carriage 18 movement mechanism is explained referring FIGS. 5–8. The carriage driving motor 22 is positioned fixedly to an appropriate position of the chassis frame 16. Therefore, the driving pulley 23 is also positioned fixedly to the chassis frame 16. The following pulley 21 is supported rotatably by a supporting shaft 44 that is supported by the bracket 43 made from synthetic resin. A guide groove 45 as a guide portion elongated parallel to the left and right moving direction of the carriage 18 is formed in the chassis frame 16. A guide supporting portion 46 is formed uniformly with a base block 43a of the bracket 43 so as to be engaged to and move along, the guide groove 45 (See FIG. 5).

The free end side of a guide shaft 43b of a round shaft shape extended from the base block 43a of the bracket 43, is penetrated in an inlet hole of a support portion 47 uniformly projected from the chassis frame 16. A compression spring 48 that is a pressing spring provided to the guide shaft 43b is arranged between the support portion 47 and the base block 43a. Because the bracket 43 is pressed by the compression spring 48 so that the shaft of the following pulley 21 in the bracket 43 and the shaft of the fixed driving pulley 23 are apart from each other, a predetermined tension is applied to the timing belt 20. The following pulley 21 has a gear portion (not shown) that is engaged to an engaging portion (not shown) provided on a surface of the timing belt 20.

By the above-described structure, because the movement of the bracket 43 is guided by the two points of the guide groove 45 of the chassis frame 16 and the inlet hole of the support portion 47, the bracket 43 can move straight and stably. Because the compression spring is provided to the guide shaft 43b, the work of engaging both edges of the tension spring to the corresponding part is not necessary, and the assembly work becomes quite easy.

A block shape stopper 49 (as a restricting member) made from synthetic resin is fixed to the rear side of the chassis frame 16 (the opposite side of the side that the following pulley 21 is positioned) by a screw 50. Thereby, the end surface of the stopper 49 contacts an appropriate position of the bracket 43, such as the guide support portion 46 to control the tension of the timing belt 20 so that it is not unnecessarily loosened.

By the above-explained structure, when the carriage driving motor 22 starts its operation and the timing belt 20 is suddenly rotated, power is generated so that the following pulley 21 approaches the driving pulley 23 by the inertia force of the state carriage 18, and thus, the tension of the timing belt 20 will be loosened. However, because the stopper 49 prevents (restricts) the bracket 43 from approaching the driving pulley 23, the tension applied to the timing belt 20 by the compression spring 48 can be maintained. Therefore, the timing belt 20 is not loosened and the improper engagement of the gear of the following pulley 21 and the engaging surface of the timing belt 20 can be prevented. Therefore, the above-described deterioration of printing quality can be prevented.

Figure 10:
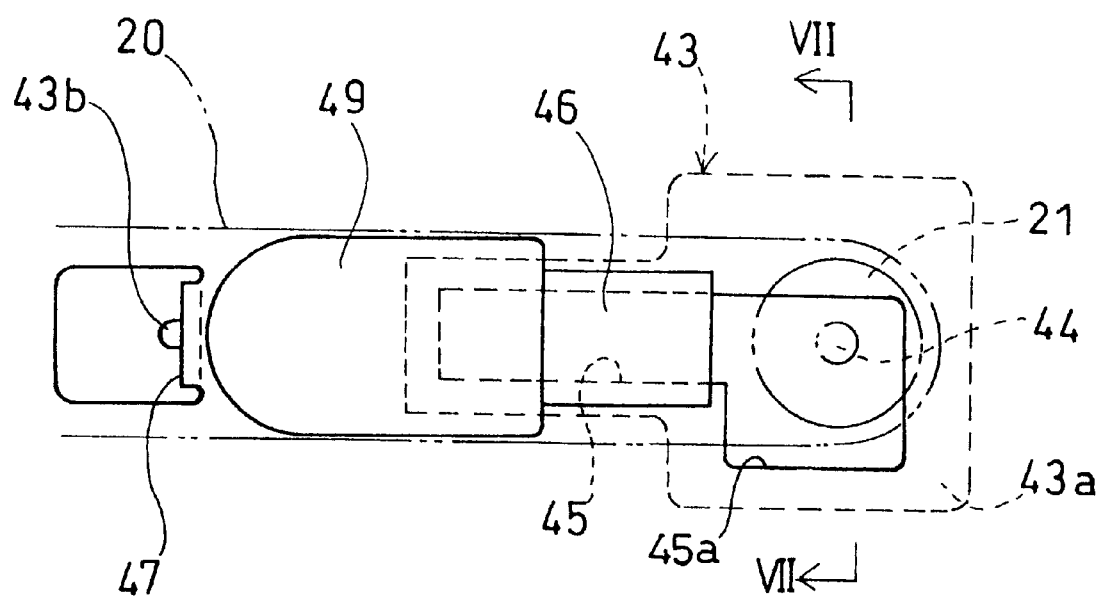
FIG. 10 is a figure showing the stopper of one embodiment of the invention.
Figure 11:
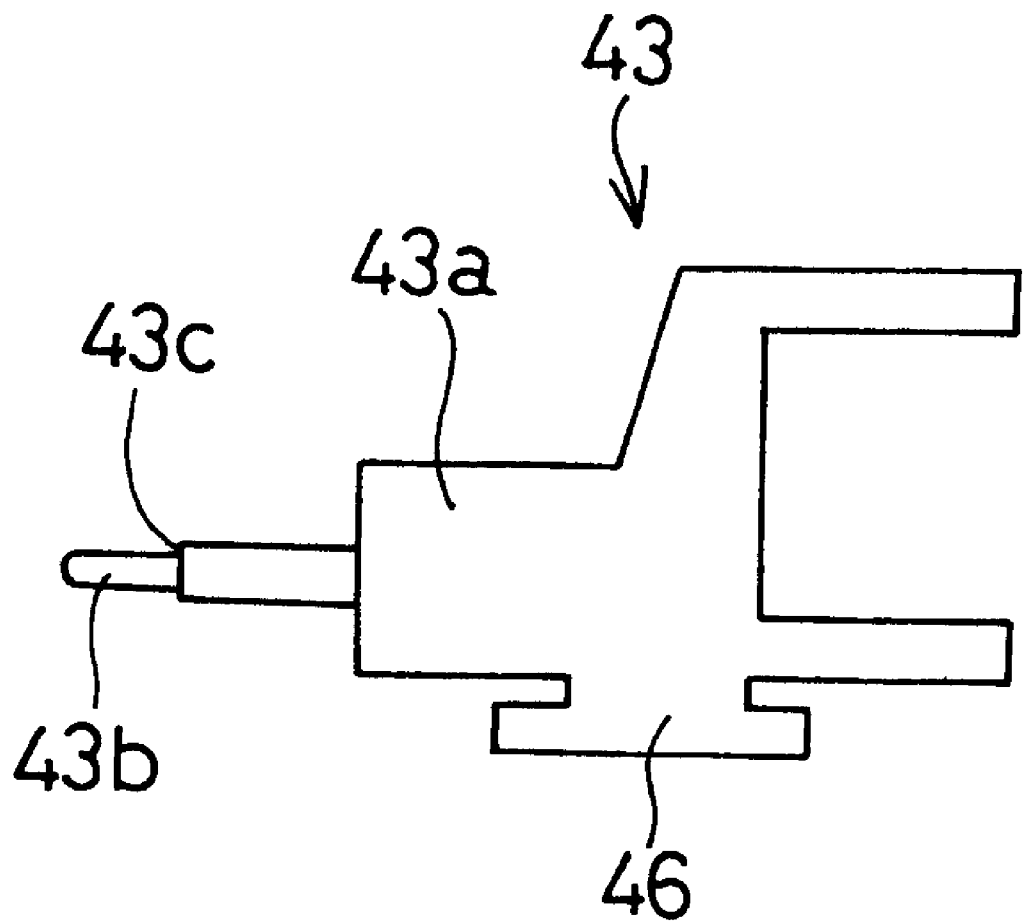
FIG. 11 is a figure showing the bracket of one embodiment of the invention.
Figure 12:
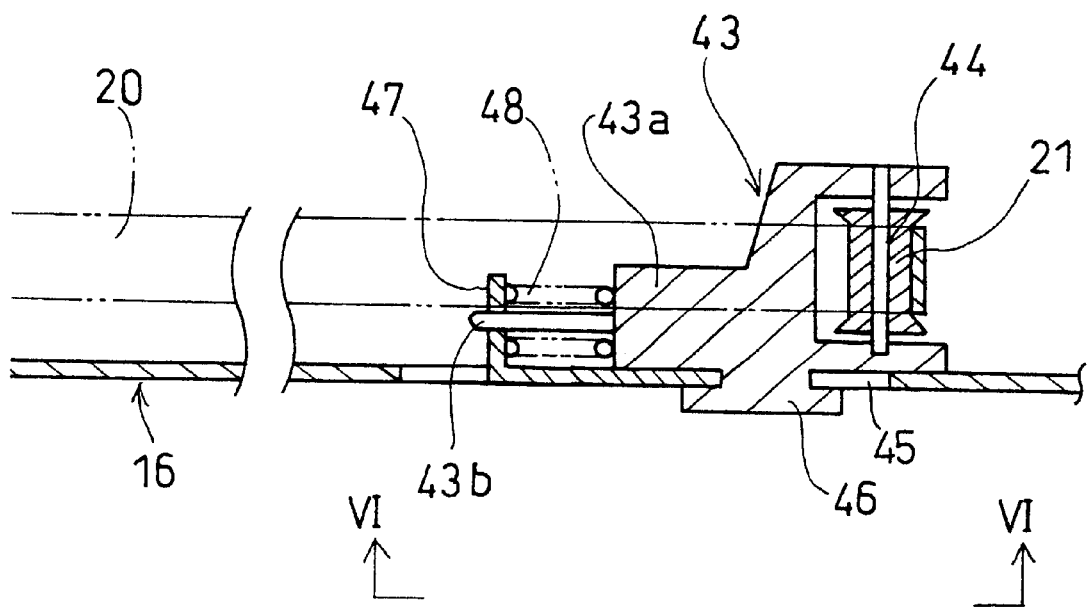
FIG. 12 is a cross sectional view of the main portion of the carriage moving means of one embodiment of the invention.

As another embodiment, as shown in FIG. 10, the stopper 49 can be fixed to the chassis frame 16 by an adhesive instead of the screw 50. Further, as shown in FIG. 11, a step portion 43c is formed substantially in the center of the guide shaft 43b of the bracket so that the stopper 49 is not necessary. In this case, the step portion 43c contacts the inlet hole of the support portion 47 and the movement of the bracket 43 is restricted. Further, as shown in FIG. 12, the movement of the bracket 43 can be restricted by controlling the length of the guide groove 45. In this case, the length of the guide groove 45 is set shorter than that shown in FIG. 5 and the guide support portion 46 contacts one end side of the guide groove 45 to restrict the movement of the bracket 43.

In the preferred embodiment, the position of the stopper 49 can be adjustable with the screw 50 connected to the chassis frame 16 by forming an elongated holes 49a in the stopper 49. When the timing belt 20 is used for a long time and becomes slack (when the distance between the shaft of the driving pulley 23 and that of the following pulley 21 becomes long), the position of the stopper 49 is changed to push the bracket 43. The initial setting position (the restricting position being capable of maintaining the predetermined tension of the timing belt) can then be set again. Thus, the stopper 49 is adjustable in order to maintain the necessary tension of the timing belt 20.

By this structure, the position of the stopper 49 can be adjusted gearlessly within a predetermined range (the length of the elongated hole 49a). However, in the above-described embodiments shown in FIGS. 10, 11 and 12, the setting position can not be changed.

Figure 6:
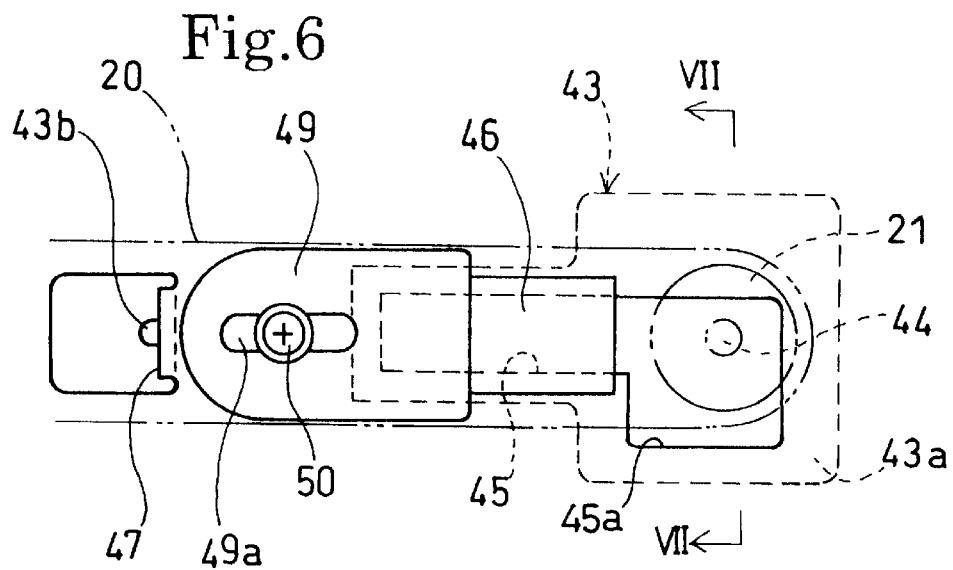
FIG. 6 is a side view from VI—VI of FIG. 5.
Figure 7:
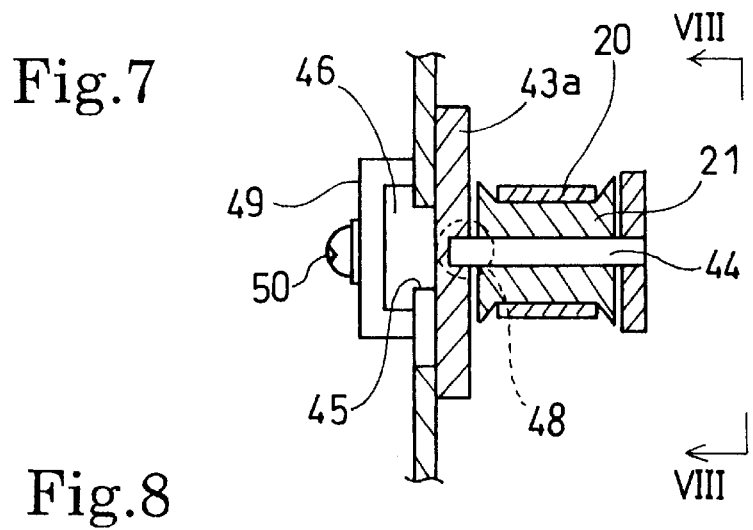
FIG. 7 is a cross sectional view taken along VII—VII of FIG. 6.
Figure 8:
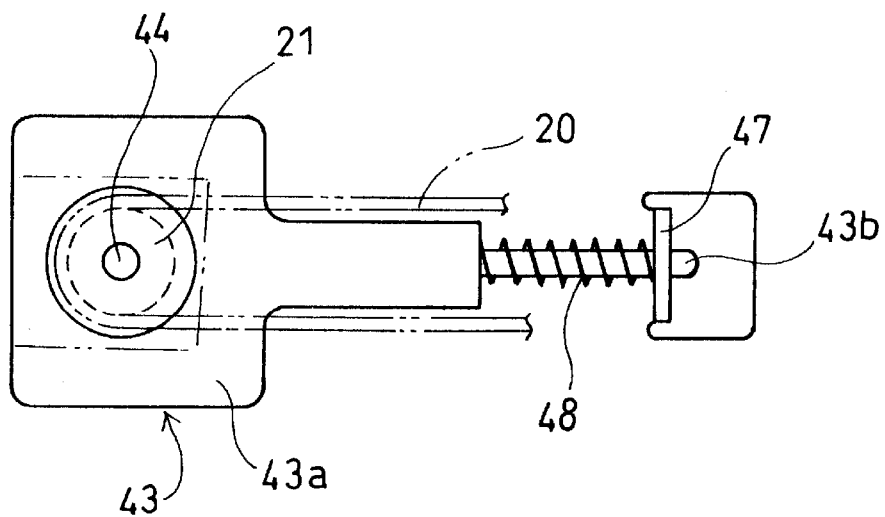
FIG. 8 is a side view from VIII—VIII of FIG. 7.

In the preferred embodiment, as shown in FIG. 6, a connecting hole 45a that is large in area, is connected to the guide groove 45 in the far side from the driving pulley 23, and is formed so that the guide support portion 46 of the bracket 43 is engaged to the guide groove 45 of the chassis frame 16. When the guide support portion 46 is engaged to the guide groove 45, the guide support portion 46 is put in the connecting hole 45a first, and then moved to the guide groove 45.

Figure 13:
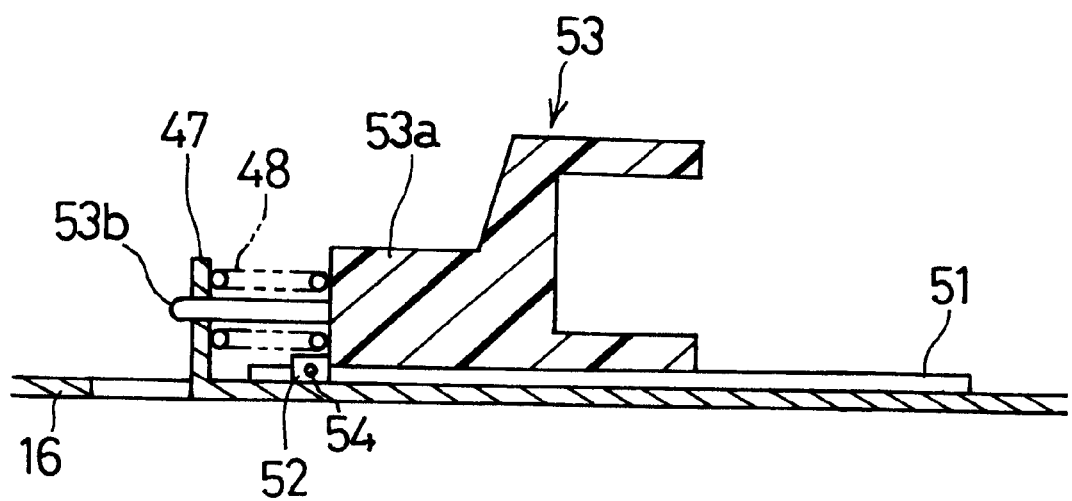
FIG. 13 is a cross sectional view of the main portion of the carriage moving of one embodiment of the invention.

Further in another embodiment, as shown in FIG. 13, a guide rail 51 can be formed on one side of the chassis frame 16 instead of the connecting hole 45a, and the bracket 53 is arranged thereon so as to move along the guide rail 51. In this case also, the movement of the bracket 53 can be restricted by arranging the stopper 52 on the guide rail 51. The stopper 52 can be fixed by an adhesive, or it can be adjusted gearlessly within a predetermined range by fixing the stopper 52 using a screw 54, for example. Any fixing member other than the screw 54 can be used if the structure can adjustably fix the position of the stopper 52 on the guide rail 51. Further, a tension spring can be connected between the bracket 43 and the chassis frame 16 to apply a predetermined tension to the timing belt 20.

Printing papers P piled in the supplying cassette 3 are separated one by one by the separating pad and the intermittent rotating supplying roller arranged in the rear part of the main lower case 1a (not shown). The top end of the separated printing paper P is fixed at the resist roller (not shown) and is transferred under the print head 15 by the upper stream side transferring roller 24. While the printing paper P is held and transferred by the upper and lower pair of transferring rollers 25, 26 in the transferring lower stream side, ink droplets are ejected onto the upper surface of the printing paper according to the printing commands to record images, and thereafter the printing paper P is discharged to the discharged paper tray 27.

Out of the printing area, the maintenance unit 29 is arranged at one or both ends of the device based on the movement of the carriage 18 (for example in the right side of FIG. 3). In the maintenance unit 29, there are arranged a nozzle wiping device (wiping device) 31 for wiping ink droplets adhered on the surface of the nozzle portion of the print head 15, and a purge device (nozzle sucking device) 30 for recovering ink that has not been properly ejected from the print head 15. In the purge device 30, the nozzle portion of the print head 15 is covered with a purge cap (not shown) so as to suck the remaining ink out of the print head 15 using the negative pressure generated by the pump for recovering the improperly ejected ink. In the home position out of the printing area from the purge device 30, there is a protection cap 32 for covering the nozzle portion of the print head 15 to prevent drying of ink.

The structure of the original reading unit 5 arranged on the upper case 1b is explained, below. As shown in FIG. 2, in the unit case 42 of synthetic resin, there are arranged an elongated image sensor (CIS) 34 of a close adherence type, an original separating roller 35a arranged adjacent to the original positioning part 9, a transferring driving roller 36a and a following roller 36b arranged in the transferring upper stream side of the image sensor 34 of the close adherence type, a transferring driving roller 37a and a following roller 37b arranged in the transferring lower stream side, and an original transferring driving unit storing in its frame, a driving motor and a line of gears for driving each of the rollers 35a, 36a, 37a.

On the lower side of the operation panel 6 whose front portion rotates around the supporting shaft 7 and moves up and down, there are arranged a separation pad 35b that contacts the upper surface of the original separating roller 35a when the operation panel 6 covers the upper portion of the unit case 42, and a pressing plate 38 whose lower surface contacts the upper surface of the close adherence type image sensor 34. According to the original reading commands from the operation of the keys on the upper surface of the operation panel 6, the original on the original positioning part 9 is separated and transferred one by one by the original separating transferring roller 35a and the separating pad 35b. When the transferred original passes between the pressing plate 38 and the upper surface of CIS 34, the image of the original is read.

Edge guides 10a of a left and right pair of original guides 10 arranged in an L shape as seen from the front, are projected from the original positioning part 9 and formed uniformly with the unit case 42 next to the rotating shaft side of the operation panel 6 in the original transferring upper stream side of the original reading unit 5, as shown in FIG. 2. Operation plates extended horizontally from the lower edge of each guide are arranged along the lower surface side of the unit case 42 by opening holes (not shown). When one original guide 10 is moved left and right by hand, the other original guide 10 moves relatively far from and close to the original guide 10 moved by hand using the engagement of the rack gears formed on one side of each operation plate with the gears projected from the lower surface side of the unit case 42. The left and right edges of the original to be transferred contact the inner surface of the left and right pair of edge guides 10a and thereby the original is guided.

The facsimile device of the invention has ordinary facsimile functions that, according to various key operations by the operation panel 6, include: setting various processing operations, reading original images by the original reading unit 5, generating transmitting data of the original image, coding the transmitting data, transmitting/receiving facsimile data to/from other facsimile devices via communicating lines such as a telephone line, decoding receiving data, and recording decoded facsimile data onto a printing paper P in the recording unit.

Other than the above-described ordinary facsimile functions, the facsimile device of the invention has following functions that include: a copying processing function for reading the original using the CIS (close adherence type image sensor) of the original reading unit 5 and forming color images on a printing paper P using each unit of the recording unit, a printer processing function for receiving print data from another apparatus, such as a personal computer (not shown) via a printer cable or a radio (i.e., wireless communications, etc.), and forming color images on the printing paper P according to the received data, and a scanner processing function for transmitting the image data read by the original reading unit 5 to another apparatus.

Figure 9:
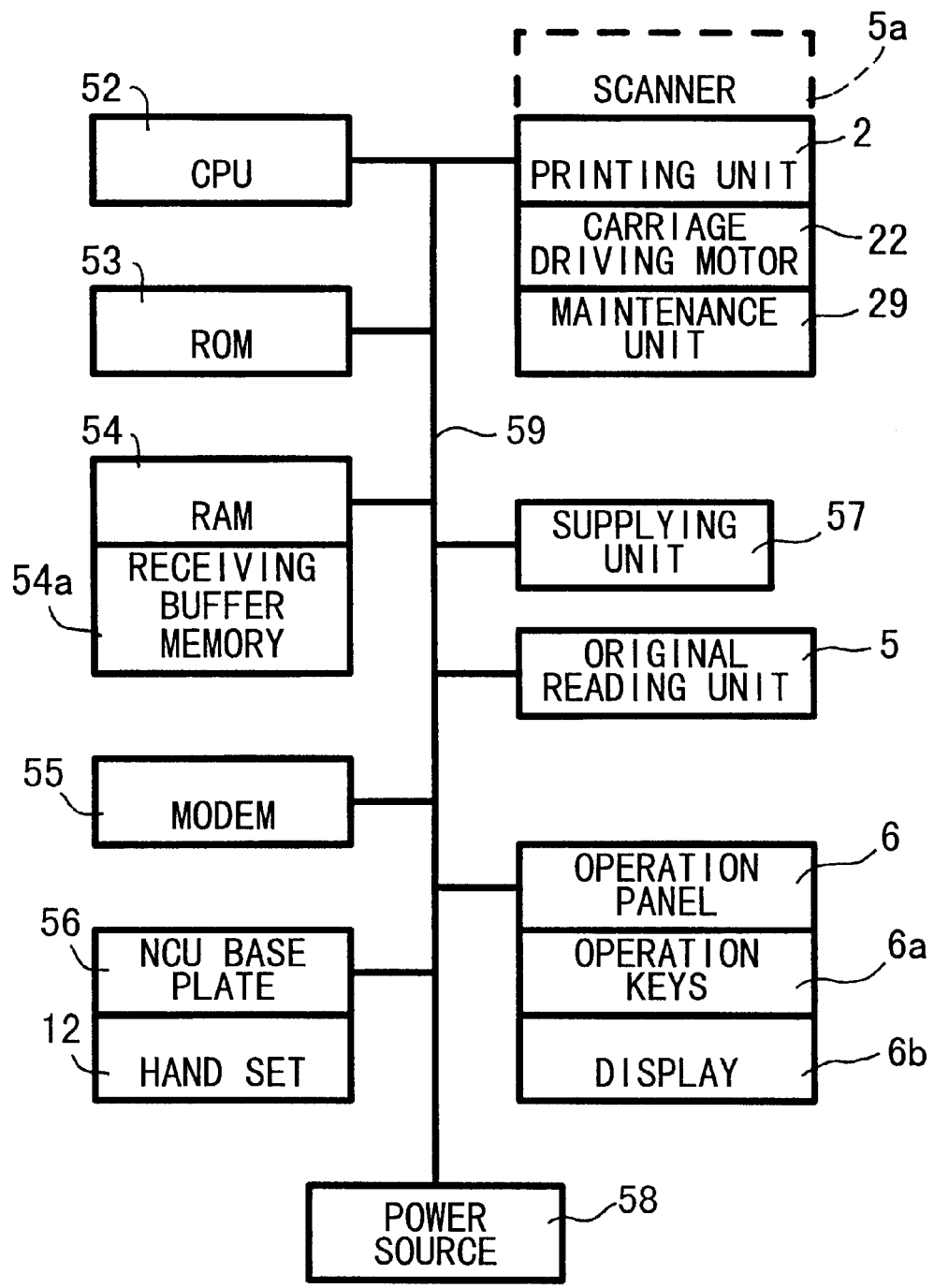
FIG. 9 is a block diagram of the control unit.

FIG. 9 shows a function block diagram for executing the above-described functions, including CPU 52 for executing various control and arithmetic, ROM 52 storing the control programs, RAM 54 a part of which is used as a receiving buffer memory 54a, NCU base plate (substrate) 56, modem 55 for transmitting/receiving facsimile data to/from the other facsimile devices via the NCU base plate (substrate) 56, a hand set 12 for communicating with other telephone devices, a printing unit 2 provided with the maintenance unit 29 and the carriage driving motor 22, a supplying unit 57 for supplying papers from the paper supplying cassette 3, an original reading unit 5, an operation panel 6 provided with a key operation unit 6a and a display 6b, and a power source 58, all of which are connected with each other via bus lines 59.

An operator executes various key operations on the operation keys 6a of the operation panel 6 to transmit facsimile data to the other facsimile devices and to execute copying. When facsimile transmission or copying is executed, an original for transmission or copying is put on the original positioning part 9. An original that passes and is read by the CIS 34 is discharged to the original receiving tray 60 provided in the front side of the main lower case 1a. If an original becomes jammed in the original reading unit 5, it can be removed by lifting the front side of the operation panel 6, as shown in FIG. 2 by the two dotted lines, to open the upper side of the original reading unit 5. After the received facsimile or print data is printed on the printing paper P in the printing unit 2, the printed paper is discharged to the discharge tray 27.

After the lock is released by pressing the lock button (not shown), the limit switch (not shown) turns OFF by lifting up the rear side (the side of the original positioning part 9) of the upper case 1b. When the rear side of the upper case 1b is lifted up, the upper case 1b rotates around the cylindrical shaft 4, located in the center in the front-rear direction, and the upper case 1b rotates toward the front. Because the position of the upper case 1b can be maintained vertically so that the operation panel 6 faces the front, it becomes possible to maintain the printing unit 2 and other parts, remove jammed printing paper P from the printing unit 2, exchange the ink cartridge 19, or check the printing unit 2 or the maintenance unit 29 for maintenance.

The same effects can be obtained by using an endless belt of a wire shape or a round belt shape instead of the timing belt in the invention. The invention can be applied to a printer, word processor, copying device or image scanner. If applied to a word processor, copying device or image scanner, as shown by one dotted line in FIG. 9, a scanner 5a such as a line scanner mounted on the carriage 18 can be used instead of/or with the print head. If applied to the print head, the invention can be applied to a print head of the hot melt ink jet type, the dot pin impact type or the thermal head type, instead of the ink jet type.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image recording/reading apparatus for recording/reading an image by reciprocatingly moving a carriage on which a print head and/or a scanner is mounted, comprising:
   a first pulley;
   a driving source that rotates the first pulley;
   a bracket being movable relative to the image recording/reading apparatus;
   a second pulley being rotatably supported by the bracket;
   a belt positioned over the first pulley and the second pulley, the belt being connected to the carriage;
   a pressing member located between the image recording/reading apparatus and the bracket, the pressing member applying tension to the belt; and
   a restricting member that restricts movement of the bracket in a direction that the belt loosens, irrespective of a force applied by the pressing member.

2. The image recording/reading apparatus of claim 1, wherein the second pulley comprises a gear portion and the belt comprises a timing belt having an engaging part that engages the gear portion.

3. The image recording/reading apparatus of claim 1, wherein the restricting member is adjustable.

4. An image recording/reading apparatus for recording/reading an image by reciprocatingly moving a carriage on which a print head and/or a scanner is mounted, comprising:
   a first pulley;
   a driving source that rotates the first pulley;
   a bracket being movable relative to the image recording/reading apparatus;
   a second pulley being rotatably supported by the bracket;
   a belt positioned over the first pulley and the second pulley, the belt being connected to the carriage;
   a pressing member located between the image recording/reading apparatus and the bracket, the pressing member applying tension to the belt; and
   a restricting member that restricts movement of the bracket in a direction that the belt loosens, and further comprising
   a frame fixedly arranged in the image recording/reading apparatus, wherein the driving source is fixed to the frame and the bracket is movably arranged relative to the frame.

5. The image recording/reading apparatus of claim 4, wherein the frame comprises a guide part for guiding the bracket.

6. The image recording/reading apparatus of claim 5, wherein the guide part comprises an opening in the frame.

7. The image recording/reading apparatus of claim 6, further comprising a guide support that rotatably supports the bracket relative to the frame, wherein the bracket is placed in the guide part.

8. The image recording/reading apparatus of claim 7, wherein the guide part comprises an inlet hole through which the guide support penetrates, and a guide groove connected to the inlet hole for guiding the guide support.

9. The image recording/reading apparatus of claim 8, wherein the restricting member is at one end of the guide groove that the guide support contacts.

10. The image recording/reading apparatus of claim 7, wherein the restricting member restricts the movement of the bracket by contacting the guide support.

11. The image recording/reading apparatus of claim 10, wherein the restricting member is fixed to the frame so that its position can be adjusted by a position adjusting unit.

12. The image recording/reading apparatus of claim 5, wherein the guide part is a rail on the frame.

13. The image recording/reading apparatus of claim 12, wherein the restricting member is provided on the rail and restricts the movement of the bracket by contacting the bracket.

14. The image recording/reading apparatus of claim 13, wherein the restricting member is fixed to the rail so that its position can be adjusted by a position adjusting unit.

15. The image recording/reading apparatus of claim 12, further comprising:
   a support provided to the frame having an inlet hole at a center thereof; and
   a guide shaft protruding from the bracket, wherein the guide shaft is movably placed in the inlet hole of the support.

16. The image recording/reading apparatus of claim 15, wherein the pressing member comprises a compression spring.

17. The image recording/reading apparatus of claim 15, wherein the guide shaft comprises a step portion as the restricting member, the step portion restricting the movement of the bracket by contacting the support.

18. The image recording/reading apparatus of claim 4, further comprising:
   a support provided to the frame having an inlet hole at a center thereof; and
   a guide shaft protruding from the bracket, wherein the guide shaft is movably placed in the inlet hole of the support.

19. The image recording/reading apparatus of claim 18, wherein the guide shaft comprises a step portion as the restricting member, the step portion restricting the movement of the bracket by contacting the support.

20. The image recording/reading apparatus of claim 18, wherein the pressing member comprises a compression spring.

21. A method for operating an image recording/reading apparatus for recording/reading an image by reciprocatingly moving a carriage on which a print head and/or a scanner is mounted, comprising:
   applying tension to a belt, the belt being positioned over a first pulley and a second pulley and connected to the carriage; and
   restricting the movement of a movable bracket in a direction that the belt loosens, irrespective of a force applied by the pressing member, the bracket supporting the second pulley.

22. The method of claim 21, further comprising pressing the movable bracket in a direction opposite to the direction that the belt loosens.

23. An image recording/reading apparatus for recording/reading an image by reciprocatingly moving a carriage on which a print head and/or a scanner is mounted, comprising:
   a first pulley;
   a driving source that rotates the first pulley;
   a bracket being movable relative to the image recording/reading apparatus;
   a second pulley being rotatably supported by the bracket;
   a belt positioned over the first pulley and the second pulley, the belt being connected to the carriage;
   a pressing member located between the image recording/reading apparatus and the bracket, the pressing member applying tension to the belt; and
   a restricting member that restricts movement of the bracket in a direction that a distance between the first pulley and the second pulley decreases and does not restrict movement of the movable bracket in a direction opposite to the direction that the distance between the first pulley and the second pulley decreases.

24. The image recording/reading apparatus of claim 23, wherein the restricting member is adjustable.

* * * * *

UNITED STATES PATENT AND TRADEMARK OFFICE
CERTIFICATE OF CORRECTION

PATENT NO. : 6,690,494 B1
DATED : February 10, 2004
INVENTOR(S) : Noriyuki Yamada It is certified that error appears in the above-identified patent and that said Letters Patent is hereby corrected as shown below:

<u>Title page,</u>
Item [54], Title, should read -- TENSION ADJUSTABLE MECHANISM FOR RECIPROCATINGLY MOVING PRINT/READ HEAD DEVICES --
Item [75], Inventor, should read -- Noriyuki Yamada, Tsushima (JP) --

Signed and Sealed this

Twenty-seventh Day of April, 2004

JON W. DUDAS
*Acting Director of the United States Patent and Trademark Office*